UNITED STATES PATENT OFFICE.

MELVIN B. CHURCH, OF GRAND RAPIDS, MICHIGAN.

INSECTICIDE.

SPECIFICATION forming part of Letters Patent No. 401,928, dated April 23, 1889.

Application filed April 1, 1887. Serial No. 233,287. (No specimens.)

*To all whom it may concern:*

Be it known that I, MELVIN B. CHURCH, of Grand Rapids, in the county of Kent and State of Michigan, have invented a new and useful Improvement in Insecticides; and I do hereby declare that the following is a full, clear, and exact description of the same.

My invention is an improved article of manufacture for destroying insects on plants, being mainly intended for the destruction of the Colorado beetle or potato-bug.

The invention is an improved article of manufacture for use as an insecticide, and is primarily an impalpable powder containing gypsum and paris-green intimately and uniformly mixed by the only method now known to obtain such mixtures—viz., by grinding the materials together.

It further consists in an impalpable powder composed of gypsum, paris-green, and flour, in the proportions hereinafter given, produced in like manner, and capable of perfect adhesion to the plants upon which it is to be used, effective in destruction of insects, and yet free from the destructive qualities common to the mixture of paris-green and dividing agents now in general use.

Heretofore attempts have been made to use paris-green and gypsum in pulverized condition for the purpose above indicated; but, owing to the difficulty arising out of the ordinary means of mixing such powdered articles uniformly, it has been necessary to use a large proportion of the paris-green in order to kill the insects, and this proportion was so great that the mixture at the same time would kill the plants, and any proportion reduced sufficiently to avoid the destruction of the plants has been found to fail of its object of killing the insects, so that such mixtures have been found to be practically useless. I have discovered that with a thorough and uniform mixture of the pulverized mixtures or ingredients a proportion of from one and one-half to two pounds of the finely-pulverized paris-green to the one hundred pounds of the mixture may be incorporated with finely-pulverized gypsum, and that this mixture will effectually destroy the insects without injury to the plants.

While the mixture composed of the intimately-mixed gypsum and paris-green is fine enough to adhere to the plants upon which it is powdered, I have found it desirable to include in the compound flour of rye or other grain, which gives it greater adhesive properties, and I add the flour in the proportion of five pounds to the one hundred pounds of the mixture.

I mix the ingredients composing the compound by grinding them together, having ascertained that by this method alone can the particles of each be intimately and uniformly mixed. While this grinding of the ingredients may be carried on in any suitable mill adapted for the purpose, I prefer to grind them together in such a mill as that shown in Letters Patent granted to me June 13, 1887, No. 259,495, as in this mill the materials will not only be thoroughly pulverized but the particles intimately mixed, so that every grain of the gypsum will carry its proper proportion of paris-green and flour.

The use of gypsum as the body of the mixture is very advantageous by reason of its well-known property of drawing and absorbing moisture, which is not only beneficial to the plants, helping to sustain them while undergoing the application of paris-green, but, as each particle of gypsum contains its proper proportion of flour and paris-green, the moisture absorbed will cause the flour to assume a pasty consistency, which will thus enable the mixture to adhere to the plants and, as has also been found, attract the insect to eat it, and each particle contains sufficient paris-green to kill the insect.

The compound, being very fine, is applied by dusting with any kind of a sifter; or where it is to be applied at a height it may be blown with a bellows or fan.

I claim as my invention—

1. As a new article of manufacture, the insecticide hereinbefore described, being an impalpable powder containing an intimate mixture of gypsum and paris-green, in the proportions set forth.

2. As a new article of manufacture, the insecticide hereinbefore described, being an impalpable powder consisting of an intimate and uniform mixture of gypsum, paris-green, and flour, in the proportions set forth.

In testimony whereof I have signed my name to this specification in the presence of two subscribing witnesses.

MELVIN B. CHURCH.

Witnesses:
CHAS. L. STURTEVANT,
WALTER DONALDSON.